(12) United States Patent
Takemori (10) Patent No.: US 10,179,483 B2
(45) Date of Patent: Jan. 15, 2019

(54) PNEUMATIC TIRE

(71) Applicant: The Yokohama Rubber Co., LTD., Minato-ku, Tokyo (JP)

(72) Inventor: Ryohei Takemori, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 67 days.

(21) Appl. No.: 15/308,347

(22) PCT Filed: Apr. 14, 2015

(86) PCT No.: PCT/JP2015/061501
§ 371 (c)(1),
(2) Date: Nov. 1, 2016

(87) PCT Pub. No.: WO2015/166803
PCT Pub. Date: Nov. 5, 2015

(65) Prior Publication Data
US 2017/0057297 A1     Mar. 2, 2017

(30) Foreign Application Priority Data
May 1, 2014   (JP) .................................. 2014-094619

(51) Int. Cl.
*B60C 11/12*      (2006.01)
*B60C 11/03*      (2006.01)

(52) U.S. Cl.
CPC .......... *B60C 11/1218* (2013.01); *B60C 11/03* (2013.01); *B60C 11/12* (2013.01);
(Continued)

(58) Field of Classification Search
CPC ................. B60C 11/12; B60C 11/1204; B60C 2011/1209; B60C 2011/1213;
(Continued)

(56) References Cited

U.S. PATENT DOCUMENTS

| 5,660,651 A | 8/1997 | Diensthuber |
| 2002/0170643 A1 | 11/2002 | Kuze |

(Continued)

FOREIGN PATENT DOCUMENTS

| JP | 6-127217 | * 5/1994 |
| JP | 2004-299592 | 10/2004 |

(Continued)

OTHER PUBLICATIONS

JP 6-127217, English language machine translation [www.epo.org]. (Year: 1994).*

(Continued)

*Primary Examiner* — Eric Hug
(74) *Attorney, Agent, or Firm* — Thorpe North & Western (57) ABSTRACT

This pneumatic tire (1) is provided with a plurality of circumferential main grooves (21, 22) extending in a tire circumferential direction, a plurality of land portions (31 to 33) defined by these circumferential main grooves (21, 22), and a plurality of lug grooves (41 to 43) disposed in these land portions (31 to 33). Additionally, at least one column of land portion (32) in a tread portion center region is provided with a plurality of blocks divided in the tire circumferential direction by the plurality of lug grooves (42) and a three-dimensional sipe (52) that extends over an entire circumference of the tire and divides the land portion (42) in a tire width direction.

15 Claims, 9 Drawing Sheets

(52) U.S. Cl.
 CPC ........ *B60C 11/124* (2013.01); *B60C 11/1236* (2013.01); *B60C 11/1263* (2013.01); *B60C 2011/1213* (2013.01)

(58) Field of Classification Search
 CPC ......... B60C 11/1218; B60C 2011/1227; B60C 2011/1231; B60C 11/1236; B60C 2011/1245; B60C 11/1263
 USPC ........................................ 152/209.18, 209.27
 See application file for complete search history.

(56) References Cited

U.S. PATENT DOCUMENTS

| | | | |
|---|---|---|---|
| 2009/0255614 A1 | 10/2009 | Ebiko | |
| 2010/0224297 A1* | 9/2010 | Kiwaki | B60C 11/11 152/209.23 |
| 2013/0180639 A1* | 7/2013 | Nagayasu | B60C 11/12 152/209.18 |
| 2014/0224394 A1* | 8/2014 | Ochi | B60C 11/0304 152/209.18 |
| 2015/0151586 A1 | 6/2015 | Furusawa | |

FOREIGN PATENT DOCUMENTS

| | | | | |
|---|---|---|---|---|
| JP | 2006-240456 | * | 9/2006 | |
| JP | 3894743 | | 3/2007 | |
| JP | 4048058 | | 2/2008 | |
| JP | 4316452 | | 8/2009 | |
| JP | 2009/248961 | | 10/2009 | |
| JP | 4350103 | | 10/2009 | |
| JP | 4769858 | | 9/2011 | |
| JP | 2012/035697 | | 2/2012 | |
| JP | 2013/252749 | | 12/2013 | |
| WO | WO 2007/097309 | | 8/2007 | |
| WO | WO 2013/046717 | * | 4/2013 | ......... B60C 11/0304 |
| WO | WO 2013/183685 | | 12/2013 | |

OTHER PUBLICATIONS

JP 2006-240456, English language machine translation [www.epo.org]. (Year: 2006).*
International Search Report for International Application No. PCT/JP2015/061501 dated Jun. 9, 2015, 4 pages, Japan.

* cited by examiner

| | CONVENTIONAL EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 |
|---|---|---|---|---|---|---|---|---|
| THREE-DIMENSIONAL SIPE OF SENSOR REGION | NO | YES | YES | YES | YES | YES | YES | YES |
| DISPOSITION OF THREE-DIMENSIONAL SIPE | - | SECOND LAND PORTION | CENTER LAND PORTION | LAND PORTION | LAND PORTION | LAND PORTION | LAND PORTION | LAND PORTION |
| INCLINATION ANGLE θ | - | 0 | 0 | 5 | 10 | 0 | 0 | 0 |
| GROOVE AREA RATIO S1, S2 | S1=S2 | S1=S2 | S1=S2 | S1=S2 | S1=S2 | S1<S2 | S1<S2 | S1<S2 |
| LUG GROOVE WIDTH Wr1, Wr2 | Wr1=Wr2 | Wr1=Wr2 | Wr1=Wr2 | Wr1=Wr2 | Wr1=Wr2 | Wr1<Wr2 | Wr1<Wr2 | Wr1<Wr2 |
| LAND PORTION WIDTH Wb1, Wb2 | Wb1=Wb2 | Wb1=Wb2 | Wb1=Wb2 | Wb1=Wb2 | Wb1=Wb2 | Wb1=Wb2 | Wb1<Wb2 | Wb1<Wb2 |
| RAISED BOTTOM PORTION OF THREE-DIMENSIONAL SIPE | - | ABSENT | ABSENT | ABSENT | ABSENT | ABSENT | ABSENT | PRESENT |
| OFF-ROAD PERFORMANCE | 100 | 103 | 101 | 104 | 101 | 105 | 106 | 107 |
| WET PERFORMANCE | 100 | 103 | 103 | 104 | 101 | 105 | 106 | 107 |

FIG. 9

PNEUMATIC TIRE

TECHNICAL FIELD

This technology relates to a pneumatic tire and particularly relates to a pneumatic tire capable of improved wet performance while maintaining off-road performance of the tire.

BACKGROUND ART

With conventional pneumatic tires mounted to a recreational vehicle (RV), there is a problem of improving a wet performance in addition to an off-road performance (such as a mud performance and a snow performance). Note that as a conventional pneumatic tire having an off-road performance, the technology described in Japanese Patent No. 4350103B is known.

SUMMARY

This technology provides a pneumatic tire capable of improved wet performance while maintaining an off-road performance of the tire.

A pneumatic tire according to this technology is a pneumatic tire, provided with: a plurality of circumferential main grooves extending in a tire circumferential direction, a plurality of land portions defined by the circumferential main grooves, and a plurality of lug grooves disposed in the land portions. In such a pneumatic tire, of a center land portion and a second land portion, at least one column of land portion is provided with a plurality of blocks divided in the tire circumferential direction by the plurality of lug grooves and a three-dimensional sipe that extends over an entire circumference of the tire and divides the land portion in a tire width direction.

With the pneumatic tire according to this technology, by a land portion of a tread portion center region being provided with the three-dimensional sipe extending over the entire circumference of the tire, an edge component of the land portion increases. By this, there is an advantage where a braking performance and a driving performance on a wet road and a snowy road improve. Additionally, by wall surfaces of the three-dimensional sipe mating when the tire contacts a ground, compared to a two-dimensional sipe, a rigidity of the blocks of the land portion is ensured. By this, there are advantages where collapsing of the blocks when braking and driving is suppressed and an off-road performance (a mud performance and a snow performance) of the tire improves.

DETAILED DESCRIPTION

Embodiments of the technology are described in detail below with reference to the accompanying drawings. However, the technology is not limited to the embodiments. In addition, the components of the embodiments include components that are replaceable while maintaining consistency with the technology, and obviously replaceable components. Furthermore, a plurality of modified examples described in the embodiments may be freely combined within the scope of obviousness to a person skilled in the art.

Pneumatic Tire

Figure 1:
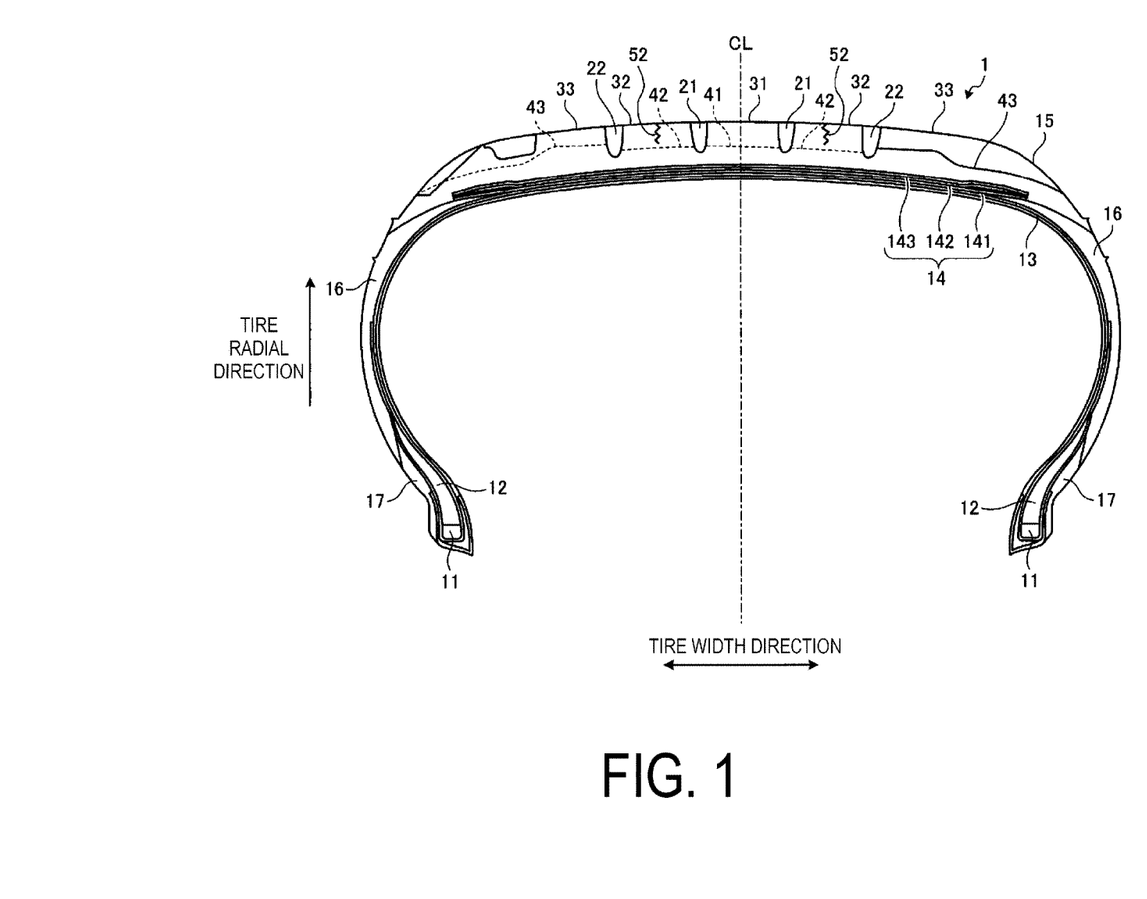
FIG. 1 is a cross-sectional view along a tire meridian direction illustrating a pneumatic tire according to an embodiment of the technology.

FIG. 1 is a cross-sectional view along a tire meridian direction illustrating a pneumatic tire according to an embodiment of the technology. The diagram illustrates a cross-sectional view of a region on one side in a tire radial direction. Also, FIG. 1 illustrates a radial tire for a passenger vehicle as an example of a pneumatic tire.

In the diagram, a cross section in the tire meridian direction refers to a cross section where the tire is cut at a plane including a tire rotation axis (not illustrated). The reference sign "CL" denotes the tire equatorial plane and refers to a plane normal to the tire rotation axis that passes through the center point of the tire in the tire rotation axis direction. The term "tire width direction" refers to a direction parallel to the tire rotation axis. The term "tire radial direction" refers to a direction normal to the tire rotation axis.

The pneumatic tire 1 has an annular structure centered on the tire rotational axis and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed on peripheries of the pair of bead cores 11, 11 in the tire radial direction and constitute the bead portions.

The carcass layer 13 extends between the left and right bead cores 11, 11 in a toroidal form, forming a framework for the tire. Additionally, both ends of the carcass layer 13 are folded toward outer sides in the tire width direction so as to wrap around the bead cores 11 and the bead fillers 12, and fixed. The carcass layer 13 is constituted by a plurality of carcass cords formed from steel or organic fibers (e.g. aramid, nylon, polyester, rayon, or the like) covered by a coating rubber and subjected to a rolling process, and has a carcass angle (inclination angle in the fiber direction of the belt cord with respect to the tire circumferential direction), as an absolute value, of from 80 degrees to 95 degrees, both inclusive.

The belt layer 14 is formed by layering a pair of cross belts 141, 142, and a belt cover 143. The belt layer 14 is disposed on the periphery of the carcass layer 13. The pair of cross belts 141, 142 are constituted by a plurality of belt cords formed from steel or organic fibers, covered by coating rubber, and subjected to a rolling process, having a belt angle, as an absolute value, from 20 degrees to 55 degrees, both inclusive. Furthermore, the pair of cross belts 141 and 142 have belt angles (inclination angle in the fiber direction of the belt cord with respect to the tire circumferential direction) of opposite signs, and the belts are layered so as to intersect each other in the belt cord fiber directions (crossply configuration). The belt cover 143 is configured by a plurality of cords formed from steel or an organic fiber material, covered by coating rubber, and subjected to a rolling process, having a belt angle, as an absolute value, from 0 to 10 degrees, both inclusive. Moreover, the belt cover 143 is disposed so as to be layered outward of the cross belts 141, 142 in the tire radial direction.

The tread rubber 15 is disposed on the outer circumference of the carcass layer 13 and the belt layer 14 in the tire radial direction, and constitutes a tread portion. The pair of the sidewall rubbers 16, 16 are disposed outward of the carcass layer 13 in the tire width direction. The sidewall rubbers 16, 16 constitute sidewall portions on the left and right sides. The pair of rim cushion rubbers 17, 17 are disposed inward of the left and right bead cores 11, 11 and the folded back portion of the carcass layer 13 in the tire radial direction. The pair of rim cushion rubbers 17, 17 constitute the contact surfaces of the left and right bead portions with the rim flanges.

Tread Pattern

Figure 2:
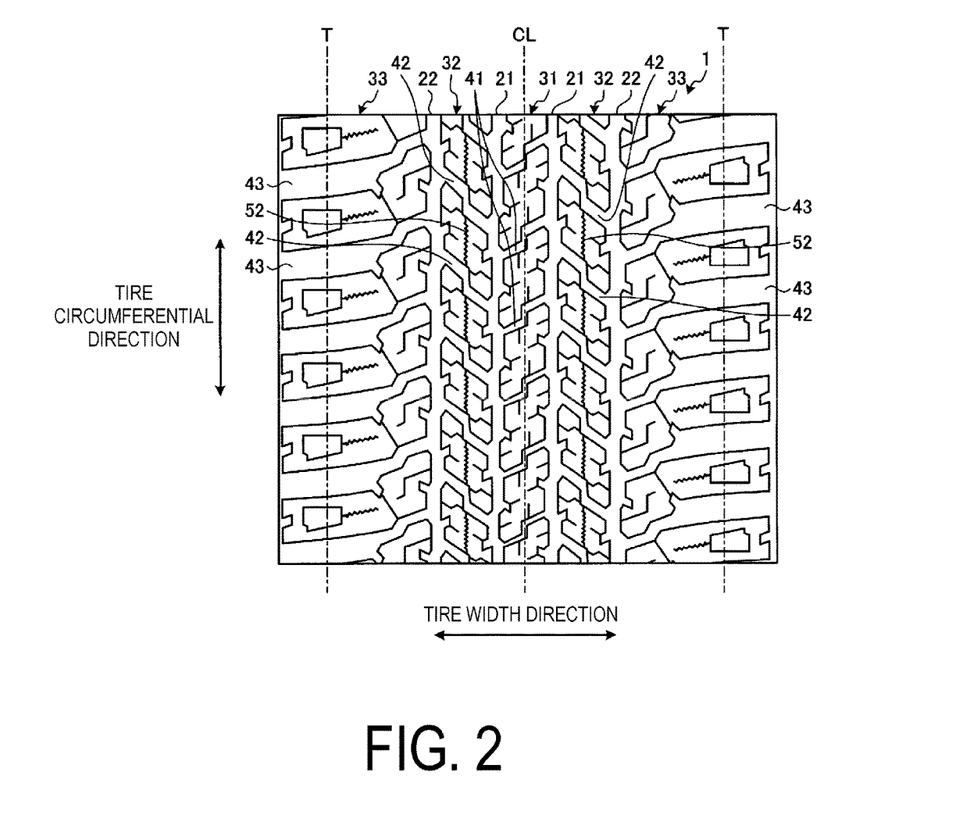
FIG. 2 is a plan view illustrating a tread surface of the pneumatic tire illustrated in FIG. 1.

FIG. 2 is a plan view illustrating a tread surface of the pneumatic tire illustrated in FIG. 1. The diagram illustrates a tread pattern of a winter tire mounted to a recreational vehicle (RV) or the like. In the diagram, "tire circumferential direction" refers to a direction around the tire rotation axis. Additionally, the reference sign T is a tire ground contact edge.

This pneumatic tire 1 is provided with, in the tread portion, a plurality of circumferential main grooves 21, 22 extending in the tire circumferential direction; a plurality of land portions 31 to 33 defined by these circumferential main grooves 21, 22; and a plurality of lug grooves 41 to 43 disposed in these land portions 31 to 33 (see FIG. 2).

A circumferential main groove is a circumferential groove having a wear indicator indicating a wear end stage and generally has a groove width of 5.0 mm or greater and a groove depth of 7.5 mm or greater. Additionally, "lug groove" refers to a horizontal groove having a groove width of 3.0 mm or greater and a groove depth of 4.0 mm or greater. Additionally, "sipe", which will be described hereinafter, refers to a cut formed in a land portion, typically with a sipe width of less than 1.0 mm.

A groove width is measured as a maximum value of a distance between left and right groove walls in a groove opening portion in an unloaded state where the tire is mounted to a specified rim and filled to a specified internal pressure. In a configuration where the land portion has a notched portion or a chamfered portion in an edge portion, the groove width is measured with an intersection between the tread surface and an extension line of the groove wall as a reference in a cross-sectional view where a groove length direction is a normal line direction. Additionally, in a configuration where a groove extends in the tire circumferential direction in a zigzag form or a wave shape, the groove width is measured with a center line of an amplitude of the groove wall as a reference.

A groove depth is measured as a maximum value of a distance from the tread surface to a groove bottom in the unloaded state where the tire is mounted to the specified rim and filled to the specified internal pressure. Additionally, in a configuration where the groove has a partial uneven portion or a sipe in the groove bottom, the groove depth is measured with these excluded.

Herein, the term "specified rim" refers to an applicable rim as defined by the Japan Automobile Tyre Manufacturers Association (JATMA), a design rim as defined by the Tire and Rim Association (TRA), or a measuring rim defined by the European Tyre and Rim Technical Organization (ETRTO). "Specified internal pressure" refers to "maximum air pressure" stipulated by JATMA, a maximum value in "tire load limits at various cold inflation pressures" defined by TRA, and "inflation pressures" stipulated by ETRTO. Additionally, "specified load" refers to "maximum load capacity" defined by JATMA, a maximum value in "tire load limits at various cold inflation pressures" defined by TRA, and "load capacity" defined by ETRTO. However, according to JATMA, for a passenger vehicle tire, the specified internal pressure is an air pressure of 180 kPa, and a specified load is 88% of maximum load capacity.

For example, in the configuration of FIG. 2, four circumferential main grooves 21, 22 having a straight shape are disposed to be laterally symmetrical across the tire equatorial plane CL. In this manner, a configuration where the plurality of circumferential main grooves 21, 22 is disposed to be laterally symmetrical with the tire equatorial plane CL as a boundary is preferable in that wear modes of left and right regions whose boundary is the tire equatorial plane CL are made uniform and a wear life of the tire improves.

However, the present technology is not limited thereto, and the circumferential main grooves 21, 22 may be disposed to be laterally asymmetrical across the tire equatorial plane CL (not illustrated). Additionally, a circumferential main groove may be disposed on the tire equatorial plane CL (not illustrated). Additionally, the circumferential main grooves may have a zigzag form or a wave shape that extends in the tire circumferential direction while bending or curving, and three or five or greater circumferential main grooves may be disposed (not illustrated).

Additionally, in the configuration of FIG. 2, five columns of land portions 31 to 33 are defined by the four circumferential main grooves 21, 22.

Here, left and right circumferential main grooves 22, 22 on an outermost side in the tire width direction are referred to as an outermost circumferential main groove. Additionally, a tread portion center region and a tread portion shoulder region are defined with the left and right outermost circumferential main grooves 22, 22 as a boundary.

Additionally, of the five columns of land portions 31 to 33, the land portion 31 in a center is referred to as a center land portion. Additionally, left and right land portions 32, 32 on a tire-width-direction inner side defined by the outermost circumferential main grooves 22, 22 are referred to as a second land portion. Additionally, left and right land portions 33, 33 on the outermost side in the tire width direction are referred to as a shoulder land portion. The left and right shoulder land portions 33, 33 are respectively disposed on left and right tire ground contact edges T, T.

Note that in the configuration of FIG. 2, the center land portion 31 is disposed on the tire equatorial plane CL. In contrast thereto, in a configuration where a circumferential main groove is disposed on the tire equatorial plane CL (not illustrated), left and right land portions defined by this circumferential main groove become the center land portion.

Additionally, in the configuration of FIG. 2, all land portions 31 to 33 respectively have the plurality of lug grooves 41 to 43, which extend in the tire width direction. Additionally, these lug grooves 41 to 43 have an open structure of penetrating the land portions 31 to 33 in the tire width direction and are arranged at predetermined intervals in the tire circumferential direction. By this, all land portions 31 to 33 are divided into a plurality of blocks in the tire circumferential direction by the lug grooves 41 to 43 and become a block column.

Note that the present technology is not limited thereto, and a semi-closed structure may be had where the lug grooves 41 to 43 terminate, at one end portion, in the land portions 31 to 33 (not illustrated). In this situation, the land portions 31 to 33 become a rib that continues in the tire circumferential direction.

Center Land Portion and Second Land Portion

Figure 3:
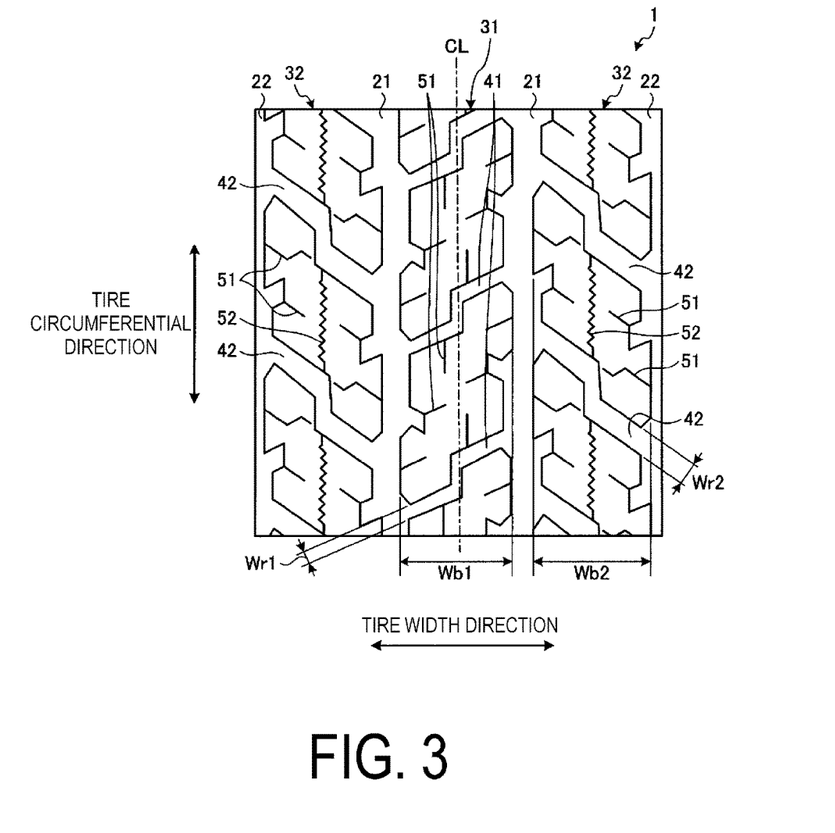
FIG. 3 is an enlarged view illustrating a land portion of a tread portion center region of the pneumatic tire illustrated in FIG. 2.
Figure 4:
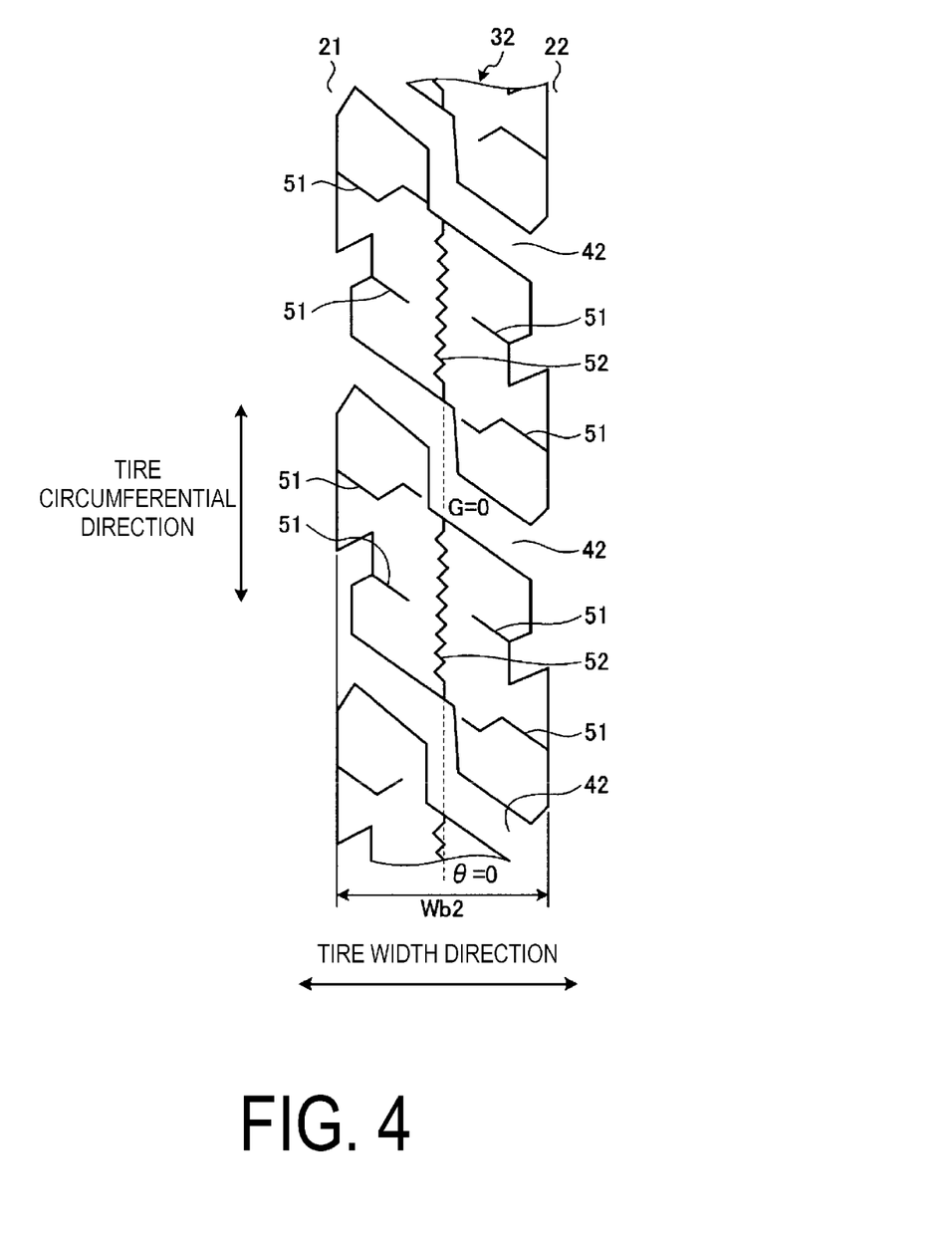
FIG. 4 is an enlarged view illustrating a second land portion illustrated in FIG. 3.

FIG. 3 is an enlarged view illustrating a land portion of the tread portion center region of the pneumatic tire illustrated in FIG. 2. FIG. 4 is an enlarged view illustrating the second land portion illustrated in FIG. 3.

With this pneumatic tire 1, land portions 31, 32 in the tread portion center region respectively have a plurality of sipes 51, 52. These sipes 51, 52 are classified as two-dimensional sipes (flat sipes) 51 and three-dimensional sipes 52. By these sipes 51, 52, an edge component of the land portions 31, 32 is ensured, and a traction of the tire improves.

A two-dimensional sipe is a sipe having a sipe wall surface of a rectilinear shape in a cross-sectional view with a sipe length direction as a normal line direction (cross-sectional view including a sipe width direction and a sipe depth direction). The two-dimensional sipe may have a straight shape in the tread surface or may have a zigzag form, a wave shape, or an arc shape.

A three-dimensional sipe is a sipe having a sipe wall surface of a shape bent in a sipe width direction in a cross-sectional view with a sipe length direction as a normal line direction. Compared to the two-dimensional sipes, the three-dimensional sipes have a greater mating force between opposing sipe wall faces and, therefore, act to reinforce rigidity of the land portions. The three-dimensional sipe may have a straight shape in the tread surface or may have a zigzag form, a wave shape, or an arc shape. For example, the following can be mentioned as such a three-dimensional sipe (see FIG. 5 and FIG. 6).

Figure 5:
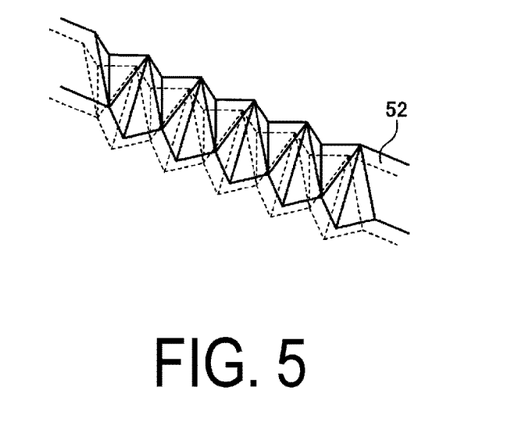
FIG. 5 is an explanatory view illustrating an example of a three-dimensional sipe.
Figure 6:
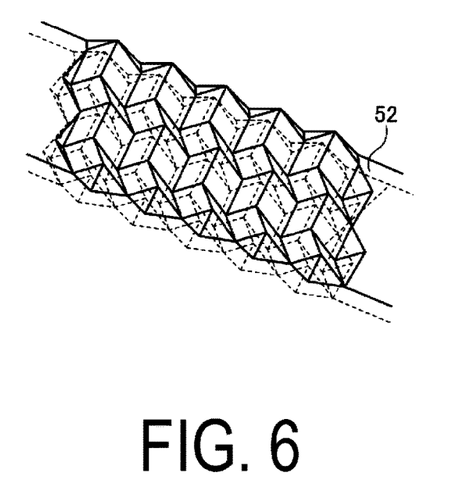
FIG. 6 is an explanatory view illustrating an example of a three-dimensional sipe.

FIGS. 5 and 6 are explanatory views illustrating examples of the three-dimensional sipe. These diagrams illustrate a transparent perspective view of a three-dimensional sipe having a sipe wall surface of a pyramid type. With these three-dimensional sipes, a pair of opposing sipe wall surfaces has a wall surface shape formed by arranging a plurality of pyramids or prisms continuously in the sipe length direction.

With the three-dimensional sipe 52 in FIG. 5, the sipe wall surface has a structure where triangular pyramids and inverted triangular pyramids are linked in the sipe length direction. In other words, the sipe wall face is formed by mutually offsetting pitches of a zigzag form of the tread surface side and a zigzag form of the bottom side in the tire width direction so that mutually opposing protrusions and recesses are formed between the zigzag forms on the tread surface side and the bottom side. Additionally, with these protrusions and recesses, when viewed in a tire rotating direction, the sipe wall face is formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and by connecting these ridge lines with consecutive planes in the tire width direction. Additionally, a first sipe wall face has a corrugated surface wherein convex pyramids and inverted pyramids are arranged alternating in the tire width direction; and a second sipe wall face has a corrugated surface wherein concave pyramids and inverted pyramids are arranged alternating in the tire width direction. Furthermore, with the sipe wall face, at least the corrugated surfaces disposed at outermost sides of both ends of the sipe are oriented toward an outer side of the blocks. Note that examples of such a three-dimensional sipe include the technology described in Japanese Patent No. 3894743B.

Additionally, with a three-dimensional sipe 52 in FIG. 6, the sipe wall surface has a structure where a plurality of prisms having a block shape is linked in a sipe depth direction and the sipe length direction while being inclined in the sipe depth direction. In other words, the sipe wall face has a zigzag form in the tread surface. Additionally, the sipe wall face has bent portions in at least two locations in the tire radial direction in the blocks that bend in the tire circumferential direction and are connected in the tire width direction. Moreover, these bent portions have a zigzag form that oscillates in the tire radial direction. Additionally, while, in the sipe wall face, the oscillation is constant in the tire circumferential direction, an inclination angle in the tire circumferential direction with respect to a normal line direction of the tread surface is configured so as to be smaller at a region on the sipe bottom side than at a region on the tread surface side; and the oscillation in the tire radial direction of the bent portion is configured so as to be greater at a region on the sipe bottom side than at a region on the tread surface side. Note that examples of such a three-dimensional sipe include the technology described in Japanese Patent No. 4316452B.

Here, with this pneumatic tire 1, of the land portions 31, 32 in the tread portion center region, at least one column of land portion 32 is provided with the three-dimensional sipe 52, which extends in the tire circumferential direction. This three-dimensional sipe 52 extends over an entire circumference of the tire and divides the land portion 32 in the tire width direction.

For example, in the configuration of FIG. 2, of the three columns of land portions 31, 32 in the tread portion center region, each block of the center land portion 31 has six two-dimensional sipes 51 but has no three-dimensional sipe 52. Additionally, all the two-dimensional sipes 51 have a semi-closed structure; at one end portion, they open to edge portions on four sides of the block, and at another end portion, they terminate inside the block. Because of this, the block is not divided by the sipes and has a continuous structure in the tire width direction. By this, a rigidity of the block is ensured.

Additionally, as illustrated in FIG. 2 and FIG. 3, each block of the left and right second land portions 32, 32 has four two-dimensional sipes 51 and one three-dimensional sipe 52. Additionally, at one end portion, all the two-dimensional sipes 51 open to edge portions of the block on circumferential-main-groove 21, 22 sides, and at another end portion, all the two-dimensional sipes 51 terminate inside the block. By this, the rigidity of the block is ensured. Meanwhile, the three-dimensional sipe 52 extends over the entire circumference of the tire and divides the block of the land portion 32 in the tire width direction. Specifically, the three-dimensional sipe 52 penetrates the block in the tire circumferential direction and opens to front and rear lug grooves 42, 42 defining the block. Additionally, the three-dimensional sipe 52 and the two-dimensional sipes 51 are not connected. By this, the rigidity of the block is ensured, and an edge component of the block is increased by the three-dimensional sipe 52.

In the configuration above, by the land portion 32 of the tread portion center region being provided with the three-dimensional sipe 52 extending over the entire circumference of the tire, the edge component of the land portion 32 increases. By this, a braking performance and a driving performance on a wet road and a snowy road improve. Additionally, by the wall surfaces of the three-dimensional sipe 52 mating when the tire contacts a ground, compared to the two-dimensional sipe 51, a rigidity of the block of the land portion 32 is ensured. By this, a snow performance of the tire improves.

Note that in the configuration of FIG. 3, a groove area ratio 51 of the center land portion 31 and a groove area ratio S2 of the second land portion 32 preferably have a relationship where S1<S2.

The groove area ratios S1, S2 are defined as: groove area in each land portion/(groove area+ground contact area). "Groove area" refers to the opening area of the grooves at the contact patch. Additionally, "groove" refers to a lug groove and a thin groove formed in the land portion and does not include a circumferential groove, a sipe, a kerf, a notched portion, or the like of the tread portion. Additionally, "ground contact area" refers to a contact area between the land portion and a road surface. Additionally, the groove area and the ground contact area are measured at a contact surface between a tire and a flat plate when the tire is mounted on a specified rim, inflated to the specified internal pressure, placed perpendicularly with respect to the flat plate in a static state, and loaded with a load corresponding to a specified load.

Additionally, in the configuration of FIG. 3, a groove width Wr1 of the lug groove 41 in the center land portion 31 in the plurality of land portions 31 to 33 and a groove width Wr2 of the lug groove 42 in the second land portion 32 have a relationship where Wr1<Wr2.

Additionally, in the configuration of FIG. 3, a land portion width Wb1 of the center land portion 31 and a land portion width Wb2 of the second land portion 32 preferably have a relationship where Wb1<Wb2.

The land portion widths Wb1, Wb2 are measured as a maximum value of a distance, in the tread surface of the land portion, in the width direction in the unloaded state where the tire is mounted to the specified rim and filled to the specified internal pressure. Additionally, in the configuration where the land portion has the notched portion or the chamfered portion in the edge portion, the land portion width is measured with the intersection between the tread surface of the land portion and the extension line of the groove wall as a reference.

[Modified Examples]

Figure 7:
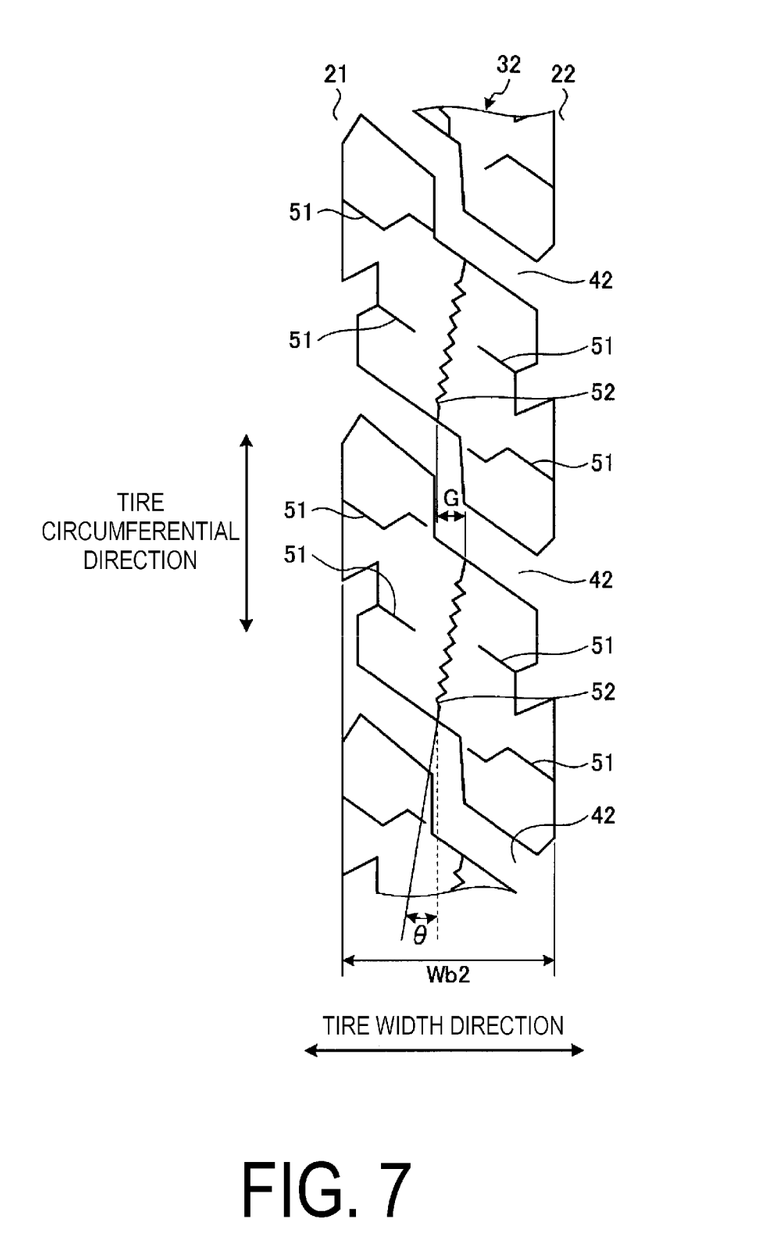
FIG. 7 is an explanatory diagram illustrating a modified example of the pneumatic tire illustrated in FIG. 1.

FIG. 7 is an explanatory view illustrating a modified example of the pneumatic tire illustrated in FIG. 1. The diagram illustrates an enlarged view of the second land portion 32 having the three-dimensional sipe 52.

In the configuration of FIG. 4, an inclination angle θ of the three-dimensional sipe 52 relative to the tire circumferential direction is θ=0 degrees. In such a configuration, because the three-dimensional sipe 52 extends in the tire circumferential direction, compared to a configuration where the three-dimensional sipe extends in the tire width direction, a rigidity of the block in the tire circumferential direction is large. By this, collapsing of the block when braking and driving is suppressed and a braking performance of the tire improves.

However, the present technology is not limited thereto, and as illustrated in FIG. 7, the three-dimensional sipe 52 may be disposed inclined relative to the tire circumferential direction. At this time, the inclination angle θ of the three-dimensional sipe 52 relative to the tire circumferential direction is preferably in a range of $-5$ degrees$\leq \theta \leq 5$ degrees. In such a configuration, by the three-dimensional sipe 52 extending substantially parallel to the tire equatorial plane CL, the rigidity of the block in the tire circumferential direction is appropriately ensured.

Additionally, in the configuration of FIG. 4, the three-dimensional sipe 52 has, at the tread surface of the land portion 32, a zigzag form extending rectilinearly in the tire circumferential direction overall. However, the present technology is not limited thereto, and the three-dimensional sipe 52 may have, at the tread surface of the land portion 32, a zigzag form extending while bending or curving overall (not illustrated).

In a configuration where the three-dimensional sipe 52 has the zigzag form bent or curved overall, the inclination angle θ of the three-dimensional sipe 52 is measured as an angle formed by a straight line connecting front and rear opening portions of the three-dimensional sipe 52 and the tire circumferential direction.

Additionally, in the configuration of FIG. 4, three-dimensional sipes 52, 52 of blocks adjacent in the tire circumferential direction are disposed with opening portions to the lug groove 42 mutually opposed. Because of this, an offset amount G of the opening portions of the adjacent three-dimensional sipes 52, 52 is G=0 mm.

However, the present technology is not limited thereto, and for example, as in FIG. 7, by the three-dimensional sipe 52 being disposed inclined relative to the tire circumferential direction, the opening portions of the adjacent three-dimensional sipes 52 may be disposed mutually offset. Additionally, at this time, the offset amount G of the three-dimensional sipes 52 and the width Wb2 of the land portion 32 preferably have a relationship where $G/Wb2 \leq 0.15$.

The offset amount G is measured as a distance in the tire width direction between opening positions to the lug groove 42 of three-dimensional sipes 52, 52 adjacent in the tire circumferential direction.

Figure 8:
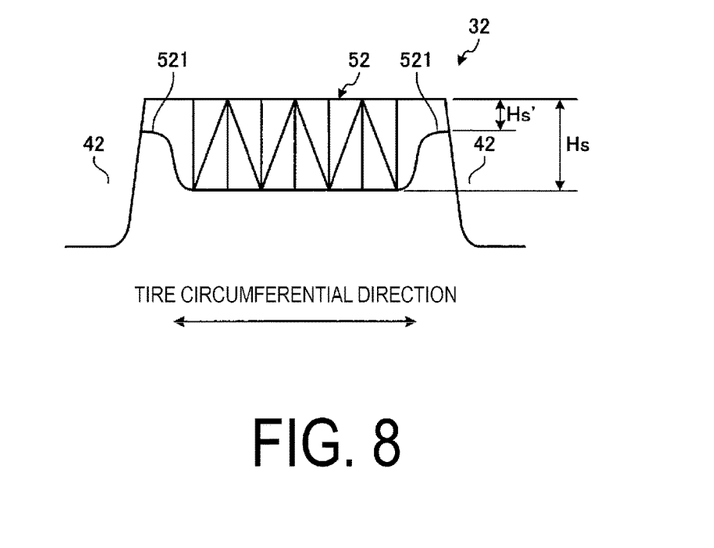
FIG. 8 is an explanatory diagram illustrating a modified example of the pneumatic tire illustrated in FIG. 1.

FIG. 8 is an explanatory view illustrating a modified example of the pneumatic tire illustrated in FIG. 1. The diagram illustrates a schematic view where the second land portion 32 is cut along the sipe wall surface of the three-dimensional sipe 52.

In the configuration of FIG. 4, the three-dimensional sipe 52 penetrates the block of the land portion 32 in the tire circumferential direction and opens to the lug grooves 42. At this time, as illustrated in FIG. 8, the three-dimensional sipe 52 preferably has raised bottom portions 521 in connecting portions to the lug grooves 42. By this, a rigidity of edge portions of the block in the tire circumferential direction is ensured and collapsing of the block when the tire contacts the ground is suppressed.

The raised bottom portion 521 of the three-dimensional sipe 52 refers to a portion where in FIG. 8 a sipe depth Hs' of the three-dimensional sipe 52 is 15% or greater and 45% or less than a maximum sipe depth Hs.

The sipe depth Hs' at the raised bottom portion 521 is measured as a distance in the sipe depth direction from a tire profile to the raised bottom portion 521.

Additionally, in the configuration of FIG. 3, the blocks of the land portions 31, 32 in the tread portion center region each have the plurality of two-dimensional sipes 51. By this, by a water absorption action and an edge component by the sipe, a wet performance and the snow performance of the tire improve.

However, the present technology is not limited thereto, and instead of the two-dimensional sipe 51, for example, a kerf, a thin groove, or the like may be disposed (not illustrated).

Additionally, in the configuration of FIG. 3, the left and right second land portions 32, 32 have the three-dimensional sipe 52 extending in the tire circumferential direction, and the center land portion 31 does not have such a three-dimensional sipe 52. Because of this, the center land portion 31 is not divided by the three-dimensional sipe 52 and has a continuous structure in the tire width direction. Because a rigidity of the center land portion 31 is ensured, such a configuration is preferable in that collapsing of the block when braking and driving is suppressed and the snow performance of the tire improves.

However, the present technology is not limited thereto, and a configuration may be adopted where the center land portion 31 has the three-dimensional sipe 52 extending in the tire circumferential direction and the left and right second land portions 32, 32 do not have such a three-dimensional sipe 52 (not illustrated).

Effect

As described above, this pneumatic tire 1 is provided with the plurality of circumferential main grooves 21, 22 extending in the tire circumferential direction; the plurality of land portions 31 to 33 defined by these circumferential main grooves 21, 22; and the plurality of lug grooves 41 to 43 disposed in these land portions 31 to 33 (see FIG. 2). Additionally, of the center land portion 31 and the second land portion 32, at least one column of land portion 32 is provided with the plurality of blocks divided in the tire circumferential direction by the plurality of lug grooves 42 and the three-dimensional sipe 52 that extends over the entire circumference of the tire and divides the land portion 32 in the tire width direction (see FIG. 3 and FIG. 4).

In such a configuration, by the land portion 32 of the tread portion center region being provided with the three-dimensional sipe 52 extending over the entire circumference of the tire, the edge component of the land portion 32 increases. By this, there is an advantage where the braking performance and the driving performance on a wet road and a snowy road improve. Additionally, by the wall surfaces of the three-dimensional sipe 52 mating when the tire contacts the ground, compared to the two-dimensional sipe, the rigidity of the block of the land portion 32 is ensured. By this, there are advantages where collapsing of the block when braking and driving are suppressed and an off-road performance (a mud performance and the snow performance) of the tire improves.

Additionally, this pneumatic tire 1 is provided with the four or more circumferential main grooves 21, 22 and the five columns of land portions 31 to 33 defined by the circumferential main grooves 21, 22 (see FIG. 2). Additionally, of the plurality of land portions 31 to 33, the center land portion 31 has the plurality of lug grooves 41 and the plurality of blocks having the continuous structure in the tire width direction (see FIG. 3). Additionally, the second land portion 32 has the plurality of lug grooves 42 and the plurality of blocks divided in the tire width direction by the three-dimensional sipe 52. In such a configuration, because the rigidity of the center land portion 31 is ensured, there are advantages where collapsing of the block when driving and braking is suppressed and the snow performance of the tire improves. Additionally, because the second land portion 32 has the three-dimensional sipe 52, compared to a configuration where the second land portion 32 has a circumferential thin groove instead of the three-dimensional sipe (not illustrated), the rigidity and the ground contact area of the land portion 32 increase. By this, there is an advantage where a turning performance of the tire on a wet road and a snowy road improves.

Additionally, this pneumatic tire 1 is provided with the four or more circumferential main grooves 21, 22 and the five columns of land portions 31 to 33 defined by the circumferential main grooves 21, 22 (see FIG. 2). Additionally, the center land portion 31 has the plurality of lug grooves 41 and the plurality of blocks divided in the tire width direction by the three-dimensional sipe 52 (not illustrated). Additionally, the second land portion 32 has the plurality of lug grooves 42 and the plurality of blocks having the continuous structure in the tire width direction. In such a configuration, because the center land portion 31 has the three-dimensional sipe 52, there is an advantage where the snow performance of the tire improves while the rigidity of the land portion 31 is ensured.

Additionally, in this pneumatic tire 1, the land portion having the three-dimensional sipe 52 (the second land portion 32 in FIG. 2) has two or more two-dimensional sipes 51 in each of the plurality of blocks (see FIG. 3). By this, there are advantages where the edge component of the land portion 32 increases and the mud performance and the snow performance of the tire improve.

Additionally, in this pneumatic tire 1, the three-dimensional sipe 52 penetrates the block of the land portion 32 in the tire circumferential direction (see FIG. 4). By this, there are advantages where the edge component of the land portion 32 increases and the mud performance and the snow performance of the tire improve.

Additionally, in this pneumatic tire 1, the inclination angle θ of the three-dimensional sipe 52 relative to the tire circumferential direction (see FIG. 4 and FIG. 7) is in the range of −5 degrees≤θ≤5 degrees. In such a configuration, because the three-dimensional sipe 52 extends substantially parallel to the tire equatorial plane CL, there are advantages where, when turning on snow, collapsing of the block is suppressed and a snow braking performance and a steering stability performance are ensured.

Additionally, in this pneumatic tire 1, the offset amount G of the opening portions of the three-dimensional sipes 52 of the blocks adjacent in the tire circumferential direction and the width Wb of the land portion 32 (the width Wb2 of the second land portion 32 in FIG. 4) have the relationship where 023 G/Wb≤0.15. By this, there are advantages where, when cornering, collapsing of the block is suppressed and the snow braking performance and the steering stability performance are ensured.

Additionally, in this pneumatic tire 1, the groove area ratio S1 of the center land portion 31 and the groove area ratio S2 of the second land portion 32 have the relationship where S1<S2 (see FIG. 3). By this, because a strong shearing force can be ensured while suppressing a decrease in the rigidity of the center land portion 31, there is an advantage where a traction performance on a muddy road improves even more.

Additionally, in this pneumatic tire 1, the groove width Wr1 of the lug groove 41 in the center land portion 31 and the groove width Wr2 of the lug groove 42 in the second land portion 32 have the relationship where Wr1<Wr2 (see FIG. 3). In such a configuration, mud discharge properties and the shearing force can be ensured while ensuring the rigidity of the center land portion 31. By this, there is an advantage where the off-road performance can be improved while maintaining steering stability.

Additionally, in this pneumatic tire 1, the land portion width Wb of the center land portion 31 and the land portion width Wb of the second land portion 32 have the relationship where Wb1<Wb2 (see FIG. 3). By this, because a total rigidity balance of the center land portion 31 improves, there is an advantage where both the mud performance and the wet performance can be provided and there is an advantage where an uneven wear performance improves.

Additionally, in this pneumatic tire 1, the three-dimensional sipe 52 connects to the lug groove 42 at least at one end portion and has the raised bottom portion 521 in the connecting portion to the lug groove 42 (see FIG. 8). In such a configuration, the rigidity of the edge portions of the block in the tire circumferential direction is ensured and collapsing of the block when the tire contacts the ground is suppressed. This leads to the advantage of the tire snow performance being enhanced.

EXAMPLES

Figure 9:
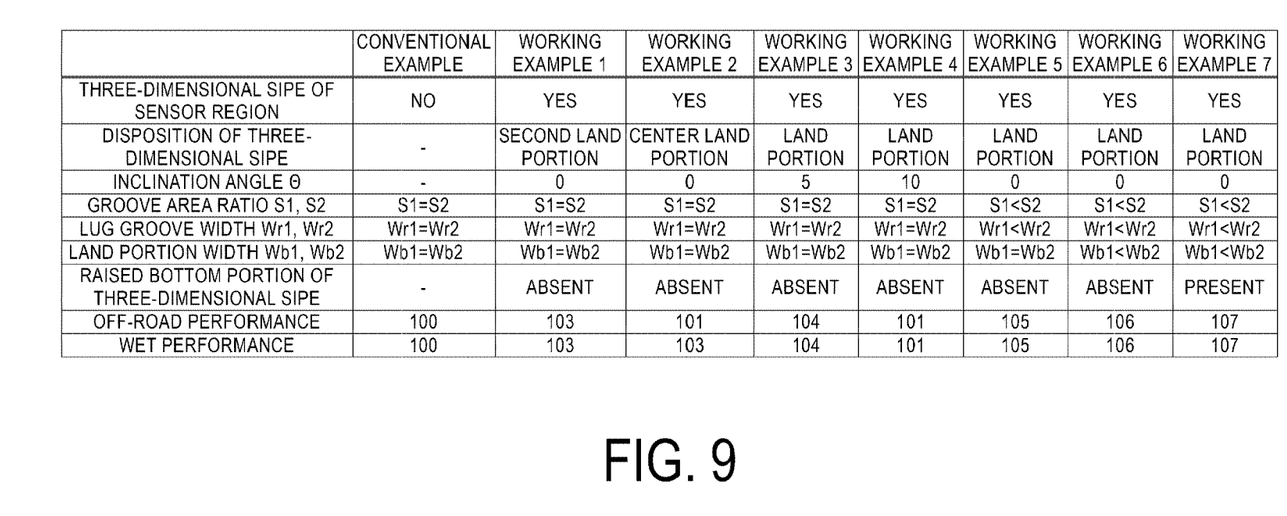
FIG. 9 is a table showing results of performance testing of the pneumatic tire according to the embodiment of the technology.

FIG. 9 is a table showing results of performance testing of pneumatic tires according to embodiments of the present technology.

In this performance testing, evaluations relating to (1) the off-road performance (the snow performance) and (2) the wet performance were performed for a plurality of types of test tires. Additionally, a test tire of a tire size of 265/70R17 113T is assembled to a rim of a rim size of 17×7.5J, and an air pressure of 230 kPa and a maximum load of the JATMA standard are imparted to this test tire. Additionally, the test tire is mounted to all wheels of an RV that is a test vehicle.

(1) In the evaluation relating to the off-road performance, the test vehicle travels a test course of a snowy road surface, and a professional test driver makes a sensory evaluation concerning a braking performance and a driving performance. Index evaluation was performed taking the results of the Conventional Example as a reference (100). Larger numerical values are preferable. Additionally, if the numerical value is 97 or greater, it can be said that the off-road performance is being appropriately maintained.

(2) In the evaluation relating to the wet performance, the test vehicle travels a wet road surface, and a braking distance from an initial speed of 40 km/h is measured. Based on the measurement results, index evaluation was performed taking the results of the Conventional Example as a reference (100). In the evaluation, larger numerical values are preferable.

Test tires of Working Examples 1 to 7 are provided with the configuration illustrated in FIG. 1 to FIG. 5. However, with the test tire of Working Example 2, the three-dimensional sipe 52 extending in the tire circumferential direction is disposed not in the second land portion 32 but in the center land portion 31. Additionally, with the test tire of Working Example 7, the lug groove widths Wr1, Wr2 of the center land portion 31 and the second land portion 32 are Wr1=4.2 mm, Wr2=6.2 mm and the land portion widths Wb1, Wb2 are Wb1=22 mm, Wb2=24 mm.

The test tire of the Conventional Example was similar to the test tire of Working Example 1except that both land portions 31, 32 of the tread portion center region are not provided with the three-dimensional sipe 52.

As indicated in the test results, it is understood that with the test tires of Working Examples 1 to 7, the wet performance can be improved while appropriately maintaining the off-road performance of the tire.

The invention claimed is:

1. A pneumatic tire, comprising:
    a plurality of circumferential main grooves extending in a tire circumferential direction;
    a plurality of land portions defined by the circumferential main grooves; and
    a plurality of lug grooves disposed in the land portions; wherein
    of a center land portion and a second land portion, at least one column of land portion being provided with a plurality of blocks divided in the tire circumferential direction by the plurality of lug grooves and a three-dimensional sipe that extends over an entire circumference of the tire and divides the land portion in a tire width direction,
    the center land portion is provided with the plurality of blocks,
    the plurality of blocks has a plurality of two-dimensional sipes opening to four sides of the block, and
    the two-dimensional sipes have a semi-closed structure with one end portion opening to an edge portion of the block and another end portion terminating inside the block.

2. The pneumatic tire according to claim 1, wherein the plurality of circumferential main grooves includes four or more circumferential main grooves and the plurality of land portions include five columns of land portions defined by the circumferential main grooves, and
    the center land portion includes the plurality of lug grooves and the plurality of blocks, the plurality of blocks having a continuous structure in the tire width direction, and the second land portion includes the plurality of lug grooves and the plurality of blocks, the plurality of blocks being divided in the tire width direction by the three-dimensional sipe.

3. The pneumatic tire according to claim 1, wherein the plurality of circumferential main grooves include four or more circumferential main grooves and the plurality of land portions includes five columns defined by the circumferential main grooves, and
    the center land portion includes the plurality of lug grooves and the plurality of blocks, the plurality of blocks being divided in the tire width direction by the three-dimensional sipe, and the second land portion includes the plurality of lug grooves and the plurality of blocks, the plurality of blocks having a continuous structure in the tire width direction.

4. The pneumatic tire according to claim 1, wherein the land portion including the three-dimensional sipe has two or more two-dimensional sipes in each of the plurality of blocks.

5. The pneumatic tire according to claim 1, wherein the three-dimensional sipe penetrates a block of the land portion in the tire circumferential direction.

6. The pneumatic tire according to claim 1, wherein an inclination angle $\theta$ of the three-dimensional sipe relative to the tire circumferential direction is in a range of $-5$ degrees $\leq \theta \leq 5$ degrees.

7. The pneumatic tire according to claim 1, wherein an offset amount G of opening portions of three-dimensional sipes of blocks adjacent in the tire circumferential direction and a width W of the land portion have a relationship where $0 \leq G / Wb \leq 0.15$.

8. The pneumatic tire according to claim 1, wherein a groove area ratio S1 of the center land portion and a groove area ratio S2 of the second land portion have a relationship where $Si < S2$.

9. The pneumatic tire according to claim 1, wherein a groove width Wr1 of a lug groove in the center land portion and a groove width Wr2 of a lug groove in the second land portion have a relationship where Wr1 <Wr2.

10. The pneumatic tire according to claim 1, wherein a land portion width wb1 of the center land portion and a land portion width Wb2 of the second land portion have a relationship where Wb1 <Wb2.

11. The pneumatic tire according to claim 1, wherein the three-dimensional sipe, at at least one end portion, connects to a lug groove and has a raised bottom portion in a connecting portion to the lug groove.

12. The pneumatic tire according to claim 1, wherein the second land portion is provided with the plurality of blocks,
the plurality of blocks has a plurality of two-dimensional sipes opening to four sides of the block, and
the two-dimensional sipes have a semi-closed structure with one end portion opening to an edge portion of the block and another end portion terminating inside the block.

13. The pneumatic tire according to claim 1, wherein the two-dimensional sipes and the three-dimensional sipe do not connect.

14. The pneumatic tire according to claim 11, wherein a sipe depth Hs' of the raised bottom portion of the three-dimensional sipe is 15% or greater and 45% or less than a maximum sipe depth Hs of the three-dimensional sipe.

15. A pneumatic tire, comprising:
a plurality of circumferential main grooves extending in a tire circumferential direction;
a plurality of land portions defined by the circumferential main grooves; and
a plurality of lug grooves disposed in the land portions;
wherein of a center land portion and a second land portion, at least one column of land portion being provided with a plurality of blocks divided in the tire circumferential direction by the plurality of lug grooves and a three-dimensional sipe that extends over an entire circumference of the tire and divides the land portion in a tire width direction,
the second land portion is provided with the plurality of blocks,
the plurality of blocks has a plurality of two-dimensional sipes opening to four sides of the block, and
the two-dimensional sipes have a semi-closed structure with one end portion opening to an edge portion of the block and another end portion terminating inside the block.

* * * * *